United States Patent [19]
Davis

[11] 4,430,590
[45] Feb. 7, 1984

[54] ELECTRIC MOTOR WITH UNITARY ROTOR HOUSING

[75] Inventor: William L. Davis, Milford, Ill.

[73] Assignee: MSL Industries, Inc., Milford, Ill.

[21] Appl. No.: 346,009

[22] Filed: Feb. 5, 1982

[51] Int. Cl.³ .............................................. H02K 7/00
[52] U.S. Cl. .................................. 310/67 R; 310/90; 310/42
[58] Field of Search .......... 310/42, 91, 67 R, 40 MM, 310/90, 172

[56] References Cited

U.S. PATENT DOCUMENTS

| 2,829,288 | 4/1958 | Schaefer . | |
|---|---|---|---|
| 2,904,709 | 9/1959 | Lautner . | |
| 3,209,434 | 10/1965 | Anderson, Jr. . | |
| 3,229,897 | 1/1966 | Papst ............................ | 310/67 R |
| 3,293,729 | 12/1966 | Morrill . | |
| 3,320,446 | 5/1979 | Anderson, Jr. . | |
| 3,458,740 | 7/1969 | Kaneko et al. .................... | 310/67 R |
| 3,513,339 | 5/1970 | Harris et al. . | |
| 3,626,221 | 12/1971 | Anderson et al. . | |
| 3,644,066 | 2/1972 | Heob et al. . | |
| 3,655,226 | 4/1972 | Cowan . | |
| 3,663,849 | 5/1972 | Heob . | |
| 3,726,575 | 4/1973 | Moorman . | |
| 3,728,563 | 4/1973 | Stone ................................ | 310/90 |
| 3,745,391 | 7/1973 | Dochterman . | |
| 3,763,386 | 10/1973 | Anderson, Jr. . | |
| 3,777,191 | 12/1973 | Papst et al. ........................ | 310/67 R |
| 3,786,290 | 1/1974 | Papst et al. . | |
| 3,919,572 | 11/1975 | Desy ............................ | 310/67 R X |
| 4,128,364 | 12/1978 | Papst et al. ..................... | 310/67 R X |
| 4,128,778 | 12/1978 | Merkle et al. ..................... | 310/67 R |
| 4,130,770 | 12/1978 | Wrobel ............................ | 310/67 R |

Primary Examiner—Mark O. Budd
Attorney, Agent, or Firm—Dressler, Goldsmith, Shore, Sutker & Milnamow, Ltd.

[57] ABSTRACT

A unit bearing electric motor is disclosed which includes a rotor assembly having a one-piece rotor housing. The rotor assembly includes a retainer which is positioned within the rotor housing and is adapted to cooperate with a portion of the cantilevered rotor shaft of the motor having a reduced cross-section. Significantly, the arrangement of the rotor assembly permits its prefabrication so that the finished rotor assembly may be readily mounted on the rotor shaft by merely advancing the rotor assembly along the shaft so that the shaft is telescopically received therein and so that the retainer of the rotor assembly is moved into cooperation with the reduced section of the rotor shaft for securely maintaining the rotor assembly in its proper position on a shaft.

10 Claims, 3 Drawing Figures

ELECTRIC MOTOR WITH UNITARY ROTOR HOUSING

TECHNICAL FIELD

The present invention relates generally to electric motor constructions, and more particularly to a unit bearing motor having a unitary rotor housing which facilitates assembly of the motor.

BACKGROUND OF THE INVENTION

Unit bearing electric motors are widely used for light to medium duty applications where quiet, efficient power is needed, as in fans or blowers for example. Such motors are usually of the induction type, and include a rotor assembly rotatably supported on a rotor shaft which is cantilevered from the frame of the motor stator. The rotor assembly typically includes a pair of rotor shaft bearings and a lubricant reservoir for providing permanent lubrication to the bearings to provide long service life for the motor with minimum maintenance. Commonly assigned U.S. Pat. No. 2,904,709, to Lautner, illustrates a unit bearing electric motor of this type.

Various arrangements are known for mounting the rotor assembly of a unit bearing motor onto the cantilevered rotor shaft of the motor. For instance, the above Lautner patent includes a generally cylindrical rotor housing within which the rotor bearings and lubricant reservoir are disposed. After the bearings and reservoir are inserted within the rotor housing, the assembly is mounted by advancing it axially of the rotor shaft of the motor until the free end of the shaft extends slightly beyond the end of the housing. A suitable retainer is affixed to the shaft for retaining the rotor assembly on the shaft, and the end of the rotor housing then closed by a suitable lubricant sealing cap. While this construction is straightforward, it will be appreciated that the various steps required in mounting and sealing the rotor assembly ultimately add to the manufacturing costs of the motor.

An arrangement which facilitates assembly of a unit bearing motor is illustrated in commonly assigned U.S. Pat. No. 3,663,849, to Heob. This patent illustrates an electric motor construction in which a retainer is assembled within the rotor housing of the rotor assembly of the motor. The rotor assembly may be assembled and sealed, and then mounted as a unit onto the rotor shaft of the motor so that the retainer cooperates with the rotor shaft for retention of the rotor assembly on the shaft. While this construction has proven very successful in minimizing manufacturing expenses of this type of motor, a fair amount of assembly is still required before the rotor assembly of the motor may be inserted as a unit onto the rotor shaft of the motor.

Since the expenses associated with assembly of unit bearing motors of the present type represent a significant percentage of the overall cost of the final product, any manner by which assembly may be facilitated helps to reduce the final cost of the product. Thus, a unit bearing electric motor construction and method of assembly which facilitates mounting of the motor rotor assembly on the rotor shaft helps to minimize the cost of the finished product.

SUMMARY OF THE INVENTION

In accordance with the present invention, a construction for a unit bearing electric motor is disclosed which facilitates mounting of the rotor assembly of the motor on the cantilevered rotor shaft of the motor. The present construction and method of assembly have proven to be so successful in decreasing the time needed to assemble the motor that the overall cost of the finished product is significantly reduced.

The unit bearing motor of the present invention includes a stator having a frame, a rotor assembly, and a rotor shaft which is cantilevered from the frame of the stator. The rotor shaft rotatably supports the rotor assembly of the motor to which is affixed a fan blade or other similar appliance which the motor is intended to drive.

The rotor assembly of the motor includes a preferably one-piece, unitary rotor housing upon which the core structure of the rotor assembly is press-fitted. The rotor housing includes a tubular, generally cylindrical portion, and has a cup-like configuration in that one end of the housing is substantially closed and the other end is open. A pair of rotor bearings are disposed within the rotor housing, and a fibrous lubricant reservoir is provided within the rotor housing in association with the bearings.

The rotor assembly is held against axial movement on the rotor shaft by a novel retainer arrangement. The arrangement includes a retainer which is inserted through the open end of the housing during fabrication of the rotor assembly before the assembly is mounted on the rotor shaft. In the preferred embodiment, the retainer includes a plurality of radially extending, axially yieldable prongs or fingers which are adapted to cooperate with the rotor shaft for holding the rotor assembly against axial movement of the shaft.

The rotor shaft of the motor includes a portion of reduced cross-section substantially spaced from the free end of the shaft and near the mounting of the shaft to the frame of the motor. The reduced shaft portion cooperates with the retainer of the rotor assembly so that the prongs of the retainer fit about the reduced shaft portion.

In order to mount the rotor assembly of the motor on the rotor shaft, the rotor assembly is first conveniently preassembled. A thrust spacer, the rotor bearings, and the lubricant reservoir are inserted within the rotor housing through its open end. The retainer of the rotor assembly is then inserted through the open end so that it is positioned generally adjacent thereto. In the preferred embodiment, the rotor housing is coined about the retainer so that the retainer is firmly held in position within the housing. The core structure of the rotor assembly may be press-fitted to the rotor housing after assembly of the other components in the above matter. The rotor assembly is then complete.

The prefabricated rotor assembly may be readily mounted on the rotor shaft of the motor by merely inserting the free end of the rotor shaft through the open end of the rotor housing end advancing the rotor assembly onto the shaft so that the shaft is telescopically received within the rotor housing. As the assembly is advanced along the rotor shaft, the prongs of the retainer in the housing yield axially until they are aligned with the shaft portion of reduced cross-section. The prongs then return to their original radially extending disposition and cooperate with the reduced shaft portion in a snap-like manner so that the rotor assembly is firmly secured to the rotor shaft and held against axial movement with respect thereto. Assembly of the electric motor is then complete, and a fan blade or like appliance may be readily mounted on the rotor housing at its closed end, which is disposed generally adjacent the free end of the shaft when the rotor assembly is in position on the shaft. It will be appreciated that because this end of the rotor housing is closed, it is unnecessary to provide a separate lubricant-sealing end cap on the rotor assembly as in arrangements heretofore known. In this way, assembly of the motor is greatly facilitated, and the overall cost of the most may be held to a minimum.

Numerous other advantages and features of the present invention will become readily apparent from the following detailed description of the invention and embodiment thereof, from the claims, and from the accompanying drawings in which like numerals are employed to designate like parts throughout the same.

DESCRIPTION OF THE PREFERRED EMBODIMENT

Figure 1:
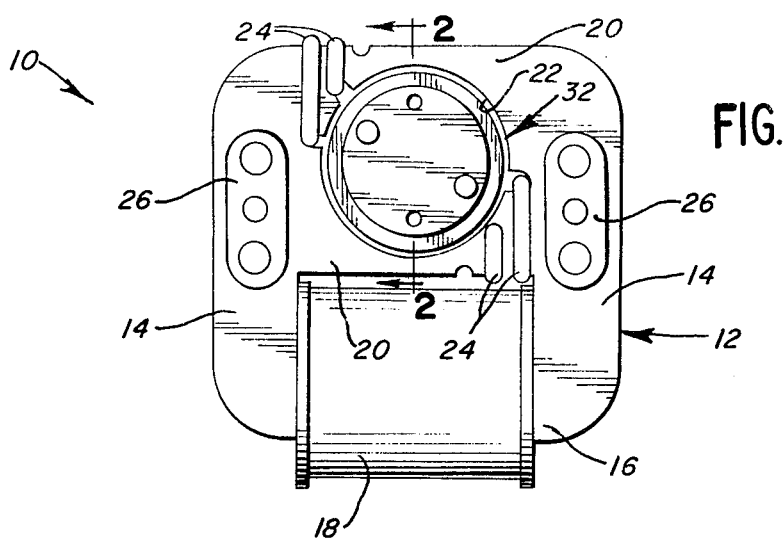
FIG. 1 is a front elevational view of the unit bearing electric motor of the present invention.

While the present invention is susceptible to embodiment in different forms, there is shown in the drawings and will hereafter be described a presently preferred embodiment with the understanding that the present disclosoure is to be considered as an exemplification of the invention and is not intended to limit the invention to the specific embodiment illustrated.

Figure 2:
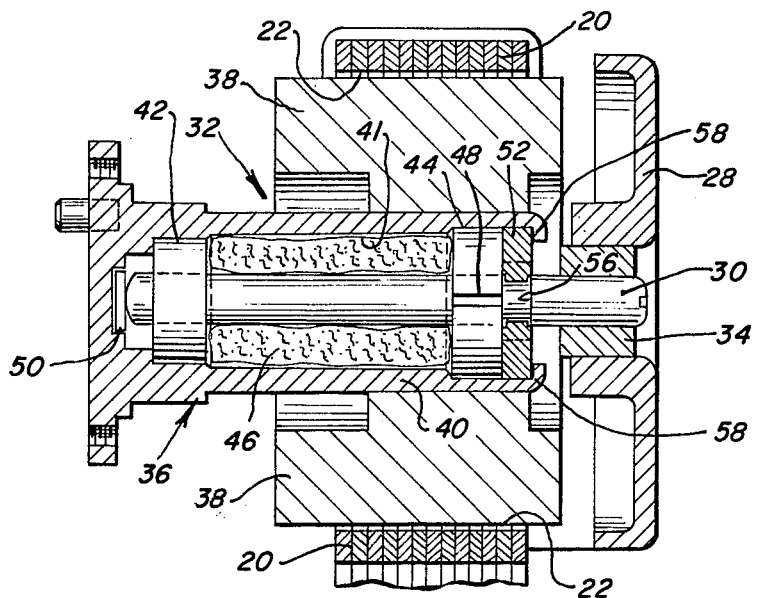
FIG. 2 is an enlarged cross-sectional view taken along lines 2—2 of FIG. 1.

With reference to FIGS. 1 and 2, therein is illustrated a unit bearing, single-phase, shaded-pole type induction electric motor 10. Motor 10 includes a stator assembly which includes a field core 12 made up of stacked laminations secured together. Field core 10 provides a closed, four-sided magnetic circuit comprising side leg portions 14 interconnected at their lower ends by a transverse leg portion 16 upon which is mounted field winding or coil 18. The upper polar part of the field core includes spaced bridge portions 20 above and below a cylindrical passage 22 which receives the rotor assembly of the motor. Pairs of shading rings 24 encircle diagonally opposite pole portions of the field core in accordance with well-known practices in motors of this type. A pair of mounting pads 26 facilitate mounting of motor 10 in position for use in a fan or blower, or like application.

A stator frame 28 (shown in cross-section in FIG. 2), formed of non-magnetic mterial, extends across the rear of laminated field core 12. Stator frame 28 supports a cantilevered rotor shaft 30 in fixed relation to the stator of the motor, with rotor shaft 30 rotatably supporting rotor assembly 32. Rotor shaft 30 is fixedly held in position, preferably by a cast-in shaft mount 34, so that rotor assembly 32 is firmly held in concentric relation to cylindrical passage 22 of the motor stator, thus providing a uniform air gap between the rotor assembly and stator.

Figure 3:
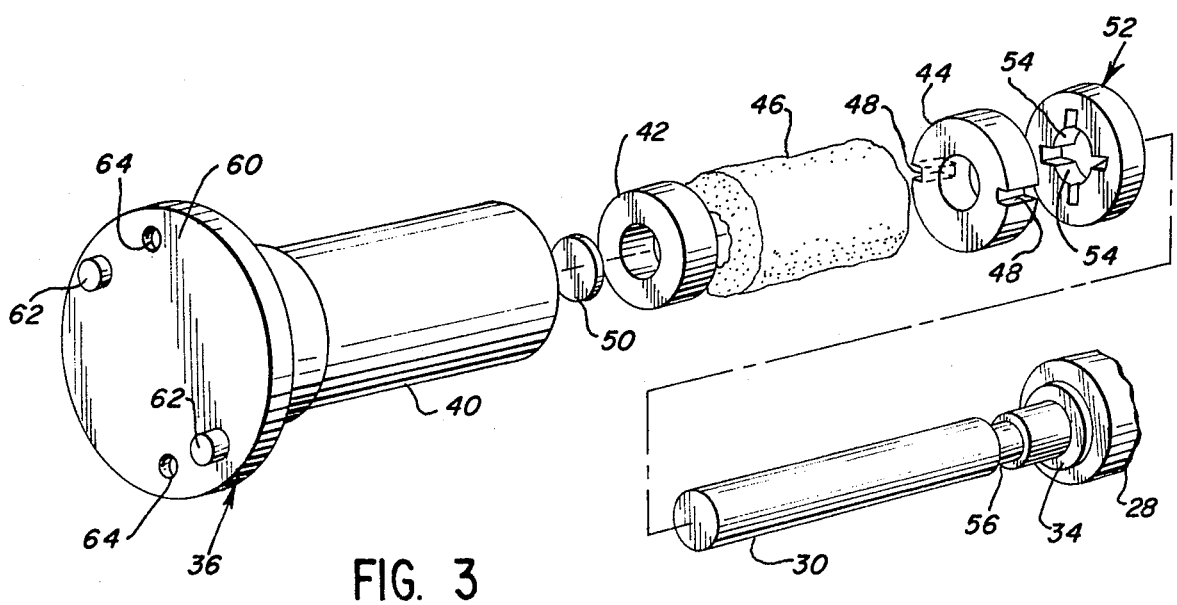
FIG. 3 is an exploded perspective view of a portion of the rotor assembly of the electric motor illustrated in FIGS. 1 and 2.

As best shown in FIGS. 2 and 3, rotor assembly 32 includes a unitary rotor housing 36 to which an annular core structure 38, sometimes referred to as the rotor winding or squirrel cage, is press-fitted or otherwise securely attached.

Rotor housing 36 includes a generally cylindrical portion 40 which defines an internal bore 41. Rotor housing 36 has a generally cup-like configuration, and includes a substantially closed end positioned generally adjacent the free end of rotor shaft 30 when the rotor assembly is in position on the rotor shaft, and an open end opposite the closed end. Rotor housing 36 is preferably fabricated from a single piece of non-magnetic material, such as by molding or die-casting.

To assure smooth running and long service life for motor 10, rotor assembly 32 includes first and second rotor bearings 42 and 44 disposed within internal bore 41 of rotor housing 36 which rotatably support the rotor assembly on the rotor shaft. Bearings 42 and 44 are preferably formed from suitably semi-porous or foraminous material, such as sintered bronze. Fabrication of bearings 42 and 44 of this type of material permits the bearings to become impregnated with lubricant, such as oil, to minimize friction between the bearings and the rotor shaft. In order to supply the bearings with lubricant, a lubricant reservoir 46 is provided within rotor housing 36 between bearings 42 and 44. Reservoir 46 preferably comprises a fibrous material, such as felt, or other suitable material which can retain an ample supply of oil or other lubricant. As shown, reservoir 46 is in contact with each of bearings 42 and 44, and is intended to rotate with the bearings about rotor shaft 32 as the motor is operated. Since reservoir 46 is intended to rotate about shaft 30, the reservoir is preferably slightly spaced from the shaft so that friction between the reservoir and the shaft does not detract from the efficiency of the motor.

As will be appreciated by those familiar with the art, an ample supply of lubricant is provided within rotor housing 36 prior to final assembly of motor 10. This lubrication is intended to be permanent in nature, so that the motor is provided with a long service life yet requires minimal maintenance. In this regard, it is important that the lubricant within the rotor housing be substantially retained within the housing without leakage. Significantly, the substantially closed end of rotor housing 36 acts to retain the lubricant within the housing without the use of a sealing end cap and O-ring as in motor designs heretofore known.

In order to minimize loss of a lubricant within the housing from its open end, bearing 44 defines one or more lubricant directing channels or ducts 48 which extend between a first face of the bearing in contact with reservoir 46, and a second face of the bearing opposite the first face. The bottom of each duct 48 is preferably inclined with respect to the axis of rotation of the rotor assembly so that centrifugal force created during operation of the motor induces movement of lubricant from the second face of the bearing toward its first face.

So that rotor assembly 32 is held against axial movement with respect to rotor shaft 30, the rotor assembly includes a thrust spacer 50 positioned adjacent the closed end of rotor housing 36, and a retainer 52 positioned between bearing 44 and the open end of the rotor housing. Thrust spacer 50 is preferably fabricated from a resilient material exhibiting suitable low frictional characteristics, such as nylon. To minimize the frictional engagement of the free end of rotor shaft 30 with thrust spacer 50, the free end of the shaft is preferably beveled or otherwise rounded so that the area of contact between the shaft and the thrust spacer is minimized.

Retainer 52 is preferably fabricated from resilient material exhibiting low frictional characteristics, such as carbon-impregnated nylon. Retainer 52 is intended to securely maintain rotor assembly 32 in position on rotor shaft 30 and substantially prevent axial movement of the rotor assembly with respect to the shaft. As best shown in FIG. 3, retainer 52 includes a plurality of radially extending, axially yieldable prong portions of fingers 54. Prongs 54 are adapted to cooperate with rotor shaft 30 for retention of the rotor assembly on the shaft. Specifically, rotor shaft 30 defines a portion of reduced cross-section 56 substantially spaced from the free end of the shaft and disposed proximate shaft mount 34. The inclusion of retainer 52 in the rotor assembly within rotor housing 36 significantly facilitates the assembly of motor 10.

FIG. 3 generally illustrates the manner in which rotor assembly 32 is assembled. It will be appreciated that in the preferred embodiment internal bore 41 of rotor housing 36 includes areas of differing diameters, and is generally tapered outwardly from the closed end of the housing toward the open end. This facilitates fabrication of the rotor assembly, and assures that the components of the assembly are properly positioned within the housing.

The components of the rotor assembly are inserted into rotor housing 36 as illustrated in FIG. 3. Thrust spacer 50 is first positioned adjacent the closed end of the housing, followed by bearing 42, lubricant reservoir 46, and bearing 44. Retainer 52 is then inserted through the open end of the housing and positioned adjacent bearing 44. While retainer 52 may be secured within rotor housing 36 in various ways, the preferred embodiment of the present invention contemplates that the portion of housing 36 which defines the open end thereof (i.e., the free end of cylindrical portion 40) is coined or otherwise deformed (as indicated by reference numeral 58 in FIG. 2) so that it fits about and firmly retains retainer 52 in position so that the retainer is held captive within the rotor housing.

Core structure 38 is then press fitted or otherwise secured to cylindrical portion 40 of rotor housing 36. The outer surface housing 36 may be provided with a plurality of circumferentially spaced, axially extending ribs or raised portions (not shown) which help to provide a secure fitting of core structure 38 on the rotor housing. After core structure 38 is in place, rotor assembly 32 is complete.

Mounting of the completed rotor assembly 32 on rotor shaft 30 may now be easily accomplished. The rotor assembly is positioned adjacent the free end of rotor shaft 30 in axial alignment therewith. The rotor shaft is then inserted through the open end of rotor housing 36, and the rotor assembly advanced axially of the shaft so that the shaft is telescopically received within the rotor housing. As this occurs, each prong portion 54 of retainer 52 cams against rotor shaft 30 and deforms by yielding axially to permit movement of the rotor assembly axially along the rotor shaft. The rounded nature of the free end of rotor shaft 30 facilitates the yielding engagement of prong portions 54 with the shaft.

As rotor assembly 32 is advanced along rotor shaft 30, the shaft extends through bearing 44, reservoir 46, and bearing 42. As the free end of shaft 30 moves into proximity with thrust spacer 50 within rotor housing 36, prong portions 54 of retainer 52 move into cooperative engagement with reduced shaft portion 56 in a self-engaging, snap-like fashion, the resilient nature of the material from which retainer 52 is fabricated assuring proper fitment of prong portions 54 about the reduced shaft portion. Preferably, the side walls of reduced shaft portion 56 are at an abrupt non-camming angle (approximately 90 degrees in the illustrated embodiment) so that retainer 52 cooperates with the reduced shaft portion to hold rotor assembly 32 against axial movement on shaft 30 for secure retention of the rotor assembly on the rotor shaft. It will be appreciated that relatively great force is required to remove the rotor assembly from the shaft after retainer 52 is moved into cooperation with reduced shaft portion 56. Mounting of rotor assembly 32 on rotor shaft 30 is now complete.

It should be noted that rotor assembly 32 is intended to cooperate with rotor shaft 30 for relatively low friction rotoatable support of the rotor assembly on the shaft. Specifically, the components of the motor are preferably dimensioned such that prongs 54 of retainer 52 do not engage the side walls of reduced shaft portion 56, while the free end of rotor shaft 30 minimally contacts thrust spacer 50. It will be noted from FIG. 2 that core structure 38 of rotor assembly 32 is offset or displaced a small amount outwardly with reference to field core 12. This preferred arrangement of the stator and rotor core structure causes the stator field to apply a small component of force on rotor assembly 22 when the motor is operating that tends to draw the rotor assembly axially inwardly toward stator frame 28, maintaining thrust spacer 50 in slight pressure contact with the free end of rotor shaft 30. As a consequence, axial movement of the rotor assembly induced by fluctuations in line voltage or any other causes are countered by the resilience of thrust spacer 50, while at the same time friction between retainer 52 and rotor shaft 30 is minimized.

After motor 10 has been assembled as described, the motor is ready for installation. Rotor housing 36 includes a mounting face 60 at its closed end, which may be provided with lugs 62 and/or mounting holes 64 for suitably fixing a fan blade or other appliance to the motor.

It will be appreciated that the construction of the present electric motor clearly facilitates its fabrication, and the arrangement of rotor housing 36 and the rotor components provided therein assure smooth, self-lubricating performance of the unit. The present motor construction and of method assembly have proven to facilitate assembly of the motor to such an extent that reduction of the overall cost of the motor, including both labor and materials, may be reduced by as much as approximately 20 percent. Obviously, savings of this magnitude are of great significance.

From the foregoing, it will be observed that numerous variations and modifications may be effected without departing from the true spirit and scope of the novel concept of the present invention. It will be understood that no limitation with respect to the specific apparatus illustrated herein is intended or should be inferred. It is, of course, intended to cover by the appended claims all such modifications which fall within the scope of the claims.

What is claimed is:
1. An electric motor, comprising:
 a stator having a frame, a rotor assembly, said rotor assembly including rotor housing means having an open end, a rotor shaft fixedly cantilevered from said frame and fixed with respect to said stator for rotatably supporting said rotor assembly, said rotor shaft having a free end, and retaining means disposed within said rotor housing means for holding said rotor assembly against axial movement on said rotor shaft, said retaining means being insertable through said open end during fabrication of said rotor assembly so that said rotor assembly is mountable on said rotor shaft after said shaft has been fixedly cantilevered from said frame by inserting said free end of said shaft into said open end and advancing the assembly axially along said rotor shaft until said retaining means cooperate with said rotor shaft to hold said rotor assembly against axial movement on said rotor shaft.

2. An electric motor in accordance with claim 1, wherein
said rotor shaft includes a portion of reduced cross-section, said retaining means cooperating with said portion for holding said rotor assembly against axial movement on said rotor shaft.

3. An electric motor in accordance with claim 2, wherein
said retaining means comprise a retainer having at least one axially yieldable prong portion, said prong portion cooperating with said shaft portion of reduced cross-section for holding said rotor assembly against axial movement on said rotor shaft.

4. An electric motor in accordance with claim 3, wherein
said retaining means is held captive within said rotor housing means by a deformed portion of said rotor housing means.

5. An electric motor in accordance with claim 3, wherein
said rotor assembly further includes foraminous bearing means for rotatably supporting said rotor assembly on said rotor shaft, and lubricant reservoir means associated with said bearing means for lubrication of said bearing means.

6. An electric motor in accordance with claim 5, wherein
said bearing means comprises first and second bearings, said reservoir means being disposed between said first and second bearings.

7. A unit bearing electric motor, comprising:
a stator having a frame,
a rotor assembly,
a rotor shaft fixedly cantilevered from said frame and having a free end, said rotor shaft rotatably supporting said rotor assembly,
said rotor assembly including a unitary rotor housing having a bore, a substantially closed end, and an open end, and retaining means within said bore for holding said rotor assembly against axial movement on said rotor shaft by cooperation of said retaining means with said rotor shaft, said retaining means being insertable through said open end of said housing during fabrication of said rotor assembly whereby said fabricated rotor assembly is mountable on said rotor shaft by inserting said free end of said shaft into said rotor housing through said open end thereof and advancing said rotor assembly axially of said shaft until said retaining means are moved into cooperation with said shaft to hold said rotor assembly against axial movement on said rotor shaft.

8. A unit bearing electric motor in accordance with claim 7, wherein
said rotor shaft includes a portion of reduced cross-section substantially spaced from said free end, said retaining means cooperating with said reduced shaft portion to hold said rotor assembly against axial movement on said rotor shaft.

9. A unit bearing electric motor in accordance with claim 8, wherein
said retaining means comprises a retainer having a plurality of radially projecting, axially yieldable finger portions which fit about and cooperate with said shaft portion of reduced cross-section for holding said rotor assembly against axial movement on said rotor shaft.

10. A unit bearing electric motor in accordance with claim 9, wherein
said rotor assembly further includes a pair of spaced, lubricant-porous bearings for rotatably supporting said rotor assembly on said rotor shaft, and a fibrous lubricant reservoir between said bearings for supplying lubricant to the bearings.

* * * * *